July 26, 1927.
H. V. McCORMICK
1,637,025
BRAKE MECHANISM
Filed Dec. 7, 1925
2 Sheets-Sheet 1
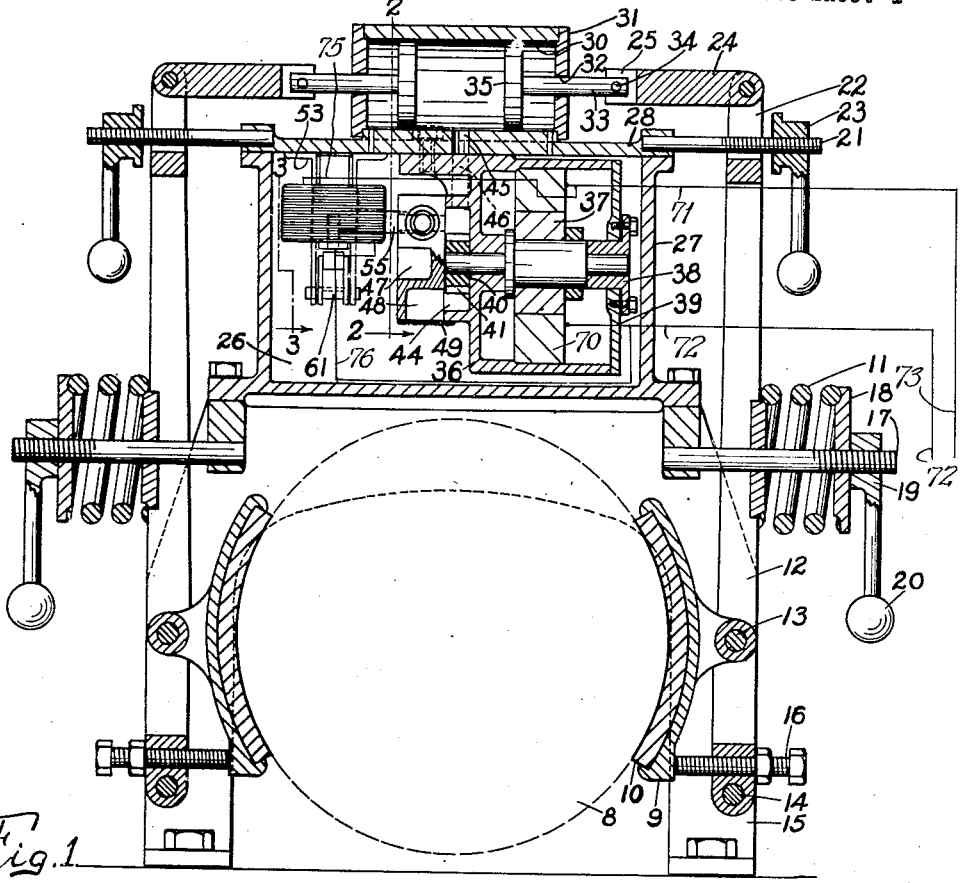
Fig. 1.
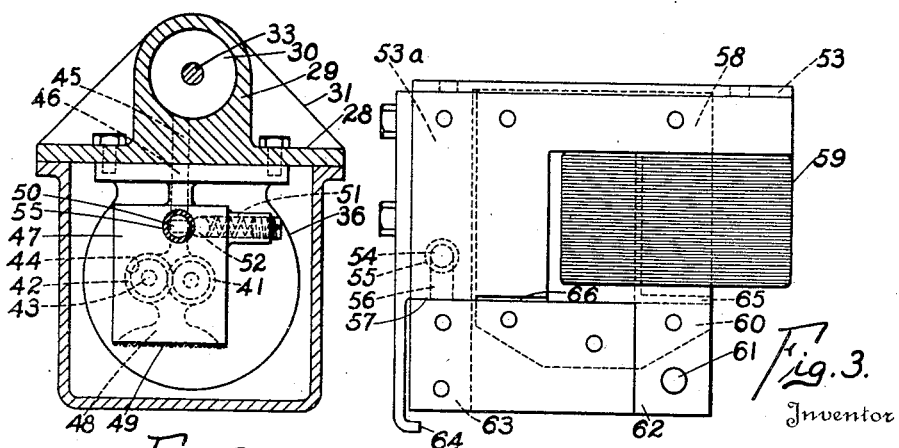
Fig. 2.
Fig. 3.
Inventor
Harold V. McCormick,
By Murray and Gugelter
Attorneys July 26, 1927.

H. V. McCORMICK 1,637,025

BRAKE MECHANISM

Filed Dec. 7, 1925

Inventor

Harold V. McCormick,

By Murray & Register

Attorneys

Patented July 26, 1927.

1,637,025

UNITED STATES PATENT OFFICE.

HAROLD V. McCORMICK, OF CINCINNATI, OHIO, ASSIGNOR TO THE WARNER ELEVATOR MANUFACTURING COMPANY, OF CINCINNATI, OHIO, A CORPORATION OF OHIO.

BRAKE MECHANISM.

Application filed December 7, 1925. Serial No. 73,629.

This invention relates to a mechanism for controlling brakes and is especially adapted to such brakes as are normally in applied or braking position upon a pulley or the like.

An object of my invention is to provide a device of the kind referred to which is novel in construction and silent in operation.

Another object is to provide a device of this kind which is efficient and operable at a minimum of expense.

Another object is to provide a device of this kind which is electrically actuated and which is adaptable to both manual and automatic control.

Another object is to provide a device of this kind, the efficiency of which is not impaired by the wearing away of the brake shoes, and which therefore requires substantially no adjustment during extended use.

These and other objects are attained by the means described herein and disclosed in the accompanying drawings, in which:

Fig. 1 is a cross sectional elevation of a device of my invention, operatively connected with a pulley and its brakes.

Fig. 2 is an enlarged cross sectional view taken on line 2—2 of Fig. 1.

Fig. 3 is a view taken on line 3—3 of Fig. 1.

Figure 4:
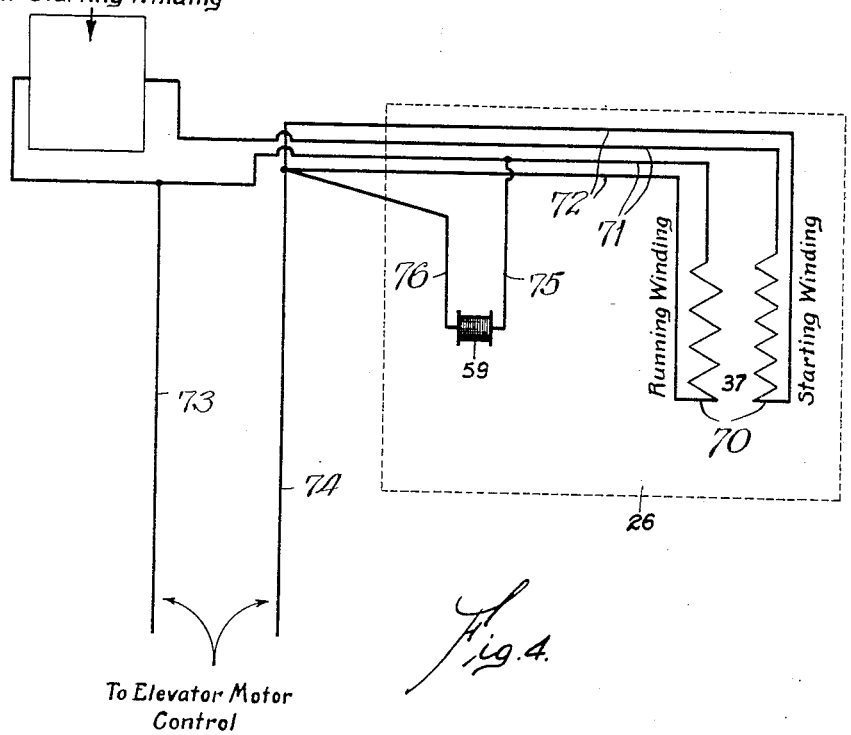
Fig. 4 is a wiring diagram of the apparatus of the invention.

The embodiment of my invention as hereinafter described, is one especially adaptable to use upon elevators and the like wherein it is desirable to have brakes which are normally in applied or braking position upon a pulley and which are released only at such times as the elevator is placed in motion. The heretofore used means for effecting the releasing movement of the brakes and their associated parts have been that of electromagnets which were energized whenever elevator moving apparatus was placed in motion. This method requires the use of a considerable amount of electrical energy and numerous means have been devised in an endeavor to effect quiet operation of the electromagnets and to preclude vibration or chattering of armatures, the electromagnets of which were energized by means of alternating current. These various means for overcoming the difficulties and annoyances with electromagnetic brakes entail considerable cost and complicated workmanship, and in addition to these, they require frequent adjustment as the brake shoes wear away and thus increase or decrease the distance between electromagnet and armature. My following described device eliminates the several disadvantages mentioned by utilizing pressure of a fluid, for example oil upon pistons and electrically controlling this pressure by any of the approved switching methods heretofore used in controlling ordinary electromagnetic brakes.

In the drawings, a brake pulley or drum 8 is adapted to be stopped and started for stopping and starting an elevator car in the usual manner. The customary brakes 9, provided with shoes 10, are normally retained in braking engagement upon the drum by means of the usual springs 11 upon brake shoe lever 12 to which the shoes 9 are pivotally mounted as at 13. The braking mechanisms may be supplied either on one or both sides of the drum and may be similar so that a description of one will suffice for both. The brake shoe lever 12 is pivotally mounted at 14 upon a supporting base or frame 15 and may be supplied with the usual adjustment screw 16 for positioning the brake shoe 10 with relation to the periphery of the drum 8. A stud 17, is secured to the frame 15 and has the spring 11 encircling it. Adjustment of the spring 11 is effected by moving a washer 18 toward or away from the brake shoe lever 12 by any suitable means such as a clamping member 19, screw threaded upon the stud 17, and conveniently operable by means of an integral handle 20. Means for limiting the outward movement of the brake shoe lever 12 away from the drum 8 is provided by employing a fixed stud 21 extending between the arms 22 of a fork at the upper end of the brake shoe lever and employing a suitable adjustment nut 23 which may be similar to the clamping member 19. Pivotally mounted between the arms 22 at the top of the brake shoe lever is a piston link 24 having forked arms 25 at its free end.

Mounted upon the frame 15 or integral therewith is an oil chamber 26 having end walls 27 and a cover member 28. Centrally of the top of the cover member 28 is disposed an elongated substantially semicylindrical boss 29 which may be integral with the cover 28 or secured thereto. A bore 30 extends through the boss 29, thus providing a cylinder upon the cover 28. End brackets 31 form a closure for opposite ends of the cylinder and are provided with aligned bores 32 through which extend piston rods 33 pivotally connected to the arms 25 of the piston links 24 by pins 34. Interiorly of the cylinder 30 are pistons 35 which may be moved toward and away from one another as the brake shoe levers are moved about their pivotal mountings. The adjustment nuts 23 serve to regulate the stroke of the pistons 35 in the cylinder 30. A combined motor and pump housing 36 is bolted to the under side of the cover 28 and depends into the oil tank 26. A fractional horse power electric motor 37 has its rotor journaled adjacent one end in the housing 36 and at its other end in a suitable journal 38 secured to a closing plate 39 of the housing 36. The stator 70 of the motor 37 is connected by conductors 71 and 72 with the main feed lines 73 and 74. The feed lines 73 and 74 are in turn connected with the elevator control board, not shown. The pump, indicated generally as 40, comprises a gear 41 keyed to the rotor shaft and a meshing gear 42 rotatably mounted upon a stud 43 secured to the housing 36. The housing 36 is provided with a recess 44 in which gears 41 and 42 may rotate, and this recess communicates with the cylinder 30 through aligned bores 45 and 46 in the cover and housing respectively. A closure member 47 for the pump housing is provided with an enlarged inlet opening 48 covered by a suitable screen 49 and communicates with the lower portion of recess 44 below the pump gears 41 and 42. The upper portion of the closure member 47 is provided with a bore 50 communicating with the upper portion of the recess 44 or that portion above the pump gears 41 and 42. A transverse bore 51 communicating with the bore 50 serves to house a spring controlled relief valve 52 of any suitable design which is adapted to be unseated upon accumulation of pressure in excess of a required amount and to establish communication with the interior of the tank 26 when so opened. An electromagnet frame 53 is secured to the cover adjacent the combined motor and pump housing which is provided with a transverse bore 54 which communicates with the bore 50 through a short section of pipe or a nipple 55. A vertical bore 56 extends from a machined bottom face 57 of the block 53ª and communicates with the bore 54. A suitable laminated magnet core 58 is provided with a magnet coil 59 and serves to attract an armature 60. The magnet coil 59 is shunted across the conductors 71 and 72 by conductors 75 and 76. A pair of non-magnetic plates 600 are pivotally mounted at 61 upon spaced side walls 62 of the magnet frame 53 and have the armature 60 secured between them. A closure block 63 is carried by the free ends of the plates 600 and has a machined face adapted to be brought into abutment with the machined face 57 on block 53ª for sealing the end of the bore 56. A suitable stop 64 limits the movement of the armature and block away from the electromagnet and the block 53ª. The motor 37 and magnet coil 59 are connected to the usual switch board of an elevator and are adapted to be energized whenever the elevator moving means are energized.

Suitable connections are provided so that magnet coil 59 is shunted in the electrical circuit of the pump motor, the motor and coil being always simultaneously energized and de-energized.

The operation of the device is as follows:

When the elevator is at rest and the elevator operating means are deenergized, the brakes are held in braking engagement with the pulley or drum 8 under the influence of the springs 11. When it is desired to move the elevator, the circuits controlling the elevator motive power are energized and at the same time magnet coil 59 and motor 37 are energized. The armature 60 is immediately attracted by the magnetized core 58 and drawn from its position against the stop 64 and carries the block 63 upwardly against the block 53ª, thereby sealing the end of bore 56. At the same time, the pump gears 41 and 42 are actuated by the motor 37 and begin to pump the oil which is contained in the tank 26 and in which are immersed the magnet, motor and pump so that oil is drawn through the screen 49 through opening 48 into the chamber provided by the recess 44 where it is driven upwardly by the gears and through the upper portion of the pump chamber and thence through the unrestricted bores 46 and 45 into that part of the cylinder 30 between the pistons 35. As the elevator continues to run, the motor 37 and magnet coil 59 remain energized and the pump continues to build up pressure between the pistons in the cylinder 30 and thereby moves the links 24 outwardly. This serves to move the brake shoe levers 12 about their pivotal mountings 14 against the resistance of the springs 11. The movement of the brake shoe levers 12 is rapid and without jar. So long as the magnet and motor remain energized, the pump continues to build up pressure. In order to conserve electrical energy and to relieve strain on the parts, the relief valve 52 is adjusted to open when the pressure in the cylinder reaches a given amount over operating pressure thereby releasing some of the oil under pressure and permitting it to flow back into the tank 26. In practice, after the brakes are released the relief valve may remain open sufficiently to permit the excess pressure to be relieved. When it is desired to stop an elevator, the elevator motive power is shut off whereupon it is desirable to immediately apply the brakes 9 to the pulley or drum 8 in order to preclude the coasting of the elevator motor from carrying the elevator car beyond its stop. As soon as the elevator motive power is shut off, the magnet coil 59 and motor 37 are immediately deenergized, whereupon the armature 60 drops and carries the block 63 away from block 53ª thereby permitting the oil to immediately discharge from the cylinder 30 through bores 45, 46, 50 and from thence through the pipe 55 into the bores 54 and 56 back into the tank 26. It will be apparent therefore, that as soon as the magnet coil 59 is deenergized, the cylinder 30 may immediately empty and the springs 11 move the brake shoe levers and apply the brakes. At the same time, the pump ceases operation so that no more oil is pumped into the various oil passages or cylinder. The combined action of the mechanism heretofore described produces a very quiet and positive operation of the brakes as well as of the actuating mechanisms themselves, the latter being entirely submerged in the oil in the tank 26.

In practice, it has been found advisable to provide an air gap as at 65 between the arm of the magnet core which is substantially aligned with the pivot 61 of magnet armature 60, and a relatively smaller air gap 66 between the remaining arm of the electromagnet core and the free end of the armature 60. The blocks are by preference, formed of nonmagnetic material such as brass and this feature, together with the feature of the air gaps, eliminates any possibility of residual magnetism after the coil 59 is deenergized. In this way, there is eliminated any possibility of the armature 60 and block 63 hanging to the magnet and thus preventing the free escape of oil and rapid dissipation of the pressure in the cylinder, when the brakes are to be applied. It should be noted that the operation of the device is not affected by extreme temperature either high or low within the range of temperature variations to which the device may be subjected. By utilizing a light transformer oil in the tank 26 and adjusting the ball relief valve so that it opens at a pressure slightly in excess of the pressure required for releasing the brake shoes there will be no difference in speed, accuracy or quietness of operation regardless of whether the temperature below, such as 10° above zero Fahrenheit or whether it be as high as in the tropics. This feature presents a strong contrast with the oil dash pots ordinarily employed in connection with electromagnetic brake releasing devices which are considerably slower in operation when the temperature is low.

What I claim is:

1. In a device of the class described the combination of a drum, a brake, means comprising a brake lever and a spring for normally retaining the brake in clamping engagement with the drum, a pressure cylinder, a piston operating in the pressure cylinder and connected with the brake lever, an electrically operated pump adapted to pump a fluid into the cylinder, a block having a discharge port therein communicating with the pump and cylinder, and electromagnetic means for closing the discharge port when the pump is actuated and a relief valve communicating with the cylinder for relieving excess pressure in the cylinder.

2. In a device of the class described the combination of a brake drum, a brake lever pivotally mounted adjacent the drum, a brake and brake shoe carried by said lever, spring means operative upon said lever and normally retaining the brake on the drum, an oil tank, an oil pump in the oil tank, an electric motor in the tank for driving the pump, a pressure cylinder carried by the tank and communicating with the pump, a piston in the cylinder adapted to be moved by fluid pressure in the cylinder and serving to move the brake lever and brake away from the drum against the resistance of the spring, and an electromagnetically controlled relief valve for permitting discharge of the contents of the cylinder into the oil tank, the motor for the pump and the electromagnetic means being arranged to be simultaneously energized and deenergized.

3. In a device of the class described the combination of a brake, brake applying means, a pressure cylinder, a piston in said cylinder for overcoming the brake applying means whereby the brake is released, means for supplying a fluid to the pressure cylinder and having a discharge port for discharging the cylinder and means comprising an electromagnet and an electric motor operable to simultaneously close the discharge port and actuate the fluid supply means.

4. In combination with an elevator and electric motive power means for operating the elevator, of braking members spring actuated to normally retain said elevator against movement, fluid pressure means for releasing the braking members and means adapted to be energized and deenergized with the elevator motive power means for rendering the fluid pressure means operative and inoperative.

5. In a device of the class described the combination with a cylinder and piston of a fluid tank, a body of fluid in the tank, conduit means providing communication between said body of fluid and the cylinder, a normally open valve permitting discharge of the cylinder into the tank, a fluid pump operable for moving fluid from the tank to the cylinder, electrically operated means for actuating the pump and electrically operated means in continuous electrical connection with the pump actuating means for closing the valve when the pump actuating means is energized.

6. In combination a cylinder, a normally open valve permitting discharge of said cylinder, a pump for directing fluid into the cylinder, an electric motor for the pump and an electromagnet in shunted electrical connection with the motor for closing the valve when the motor is energized.

7. In combination, a cylinder, a normally open valve permitting discharge of said cylinder, a pump for directing fluid into the cylinder, an electric motor for driving the pump, an electromagnet in shunted electrical connection with the motor and adapted to close the valve while the motor is energized and means operable at a predetermined pressure in the cylinder for relieving excess pressure in said cylinder to permit continuous operation of the motor at normal load.

8. In a device of the class described the combination with a brake drum and a brake normally in braking engagement therewith, of means for releasing the brake comprising a pressure cylinder, a pump and a motor for the pump, and means operative and inoperative as the motor is energized and de-energized for sealing and opening the cylinder.

In testimony whereof, I have hereunto subscribed my name this 3rd day of December, 1925.

HAROLD V. McCORMICK.